United States Patent
Nishijima

[19]

[11] Patent Number: 5,915,069
[45] Date of Patent: Jun. 22, 1999

[54] APPARATUS AND METHOD FOR RECORDING A VIDEO SIGNAL ON A RECORD MEDIUM

[75] Inventor: Takeo Nishijima, Kanagawa, Japan

[73] Assignee: Sony Corporation, Tokyo, Japan

[21] Appl. No.: 08/715,862

[22] Filed: Sep. 19, 1996

[30] Foreign Application Priority Data

Sep. 27, 1995 [JP] Japan .................................. 7-249924

[51] Int. Cl.⁶ .............................. H04N 5/917; H04N 7/26
[52] U.S. Cl. .................... 386/112; 386/117; 360/5; 348/143
[58] Field of Search .................... 386/109, 111, 386/112, 117, 125, 126; 360/5, 8; 348/143, 152, 153, 154, 155, 158, 159

[56] References Cited

U.S. PATENT DOCUMENTS

| | | | |
|---|---|---|---|
| 5,521,634 | 5/1996 | McGary | 348/169 |
| 5,539,528 | 7/1996 | Tawa | 358/335 |
| 5,596,581 | 1/1997 | Saeijs et al. | 370/394 |
| 5,696,558 | 12/1997 | Tsukamoto | 348/405 |

*Primary Examiner*—Wendy Garber
*Assistant Examiner*—Christopher Onuaku
*Attorney, Agent, or Firm*—Frommer Lawrence & Haug, LLP; William S. Frommer; Dennis M. Smid

[57] ABSTRACT

Video surveillance system which records compressed video signals on a record medium that have been compressed at a controllably selectable compression ratio. An image is picked-up by a camera and a video signal is produced therefrom. The video signal is compressed at a selectable compression ratio depending on the occurrence of a predetermined condition and the compressed video signal is recorded on a record medium. If the occurrence of a predetermined condition or event (or events) is not detected, the compression ratio is established to be a relatively high compression ratio, whereas upon the detection of the occurrence of the predetermined condition or event, the compression ratio is established to be a relatively low compression ratio. In addition, the compressed video signal may be recorded intermittently or continuously on the record medium depending on whether the predetermined condition is detected.

34 Claims, 6 Drawing Sheets

FIG. 3

B (TABLE 2)

| | | | | | | | |
|---|---|---|---|---|---|---|---|
| 2 | 2 | 2 | 2 | 2 | 12 | 12 | 12 |
| 2 | 2 | 2 | 2 | 12 | 12 | 12 | 20 |
| 2 | 2 | 2 | 12 | 12 | 12 | 20 | 20 |
| 2 | 2 | 12 | 12 | 12 | 20 | 20 | 20 |
| 2 | 12 | 12 | 12 | 20 | 20 | 20 | 30 |
| 12 | 12 | 12 | 20 | 20 | 20 | 30 | 30 |
| 12 | 12 | 20 | 20 | 20 | 30 | 30 | 30 |
| 12 | 20 | 20 | 20 | 30 | 30 | 30 | 30 |

A (TABLE 1)

| | | | | | | | |
|---|---|---|---|---|---|---|---|
| 1 | 1 | 1 | 1 | 1 | 10 | 10 | 10 |
| 1 | 1 | 1 | 1 | 10 | 10 | 10 | 15 |
| 1 | 1 | 1 | 10 | 10 | 10 | 15 | 15 |
| 1 | 1 | 10 | 10 | 10 | 15 | 15 | 15 |
| 1 | 10 | 10 | 10 | 15 | 15 | 15 | 15 |
| 10 | 10 | 10 | 15 | 15 | 15 | 20 | 20 |
| 10 | 10 | 15 | 15 | 15 | 20 | 20 | 20 |
| 10 | 15 | 15 | 15 | 20 | 20 | 20 | 20 |

C (TABLE 3)

| | | | | | | | |
|---|---|---|---|---|---|---|---|
| 4 | 4 | 4 | 4 | 4 | 15 | 15 | 15 |
| 4 | 4 | 4 | 4 | 15 | 15 | 15 | 30 |
| 4 | 4 | 4 | 15 | 15 | 15 | 30 | 30 |
| 4 | 4 | 15 | 15 | 15 | 30 | 30 | 30 |
| 4 | 15 | 15 | 15 | 30 | 30 | 30 | 50 |
| 15 | 15 | 15 | 30 | 30 | 30 | 50 | 50 |
| 15 | 15 | 30 | 30 | 30 | 50 | 50 | 50 |
| 15 | 30 | 30 | 30 | 50 | 50 | 50 | 50 |

APPARATUS AND METHOD FOR RECORDING A VIDEO SIGNAL ON A RECORD MEDIUM

BACKGROUND OF THE INVENTION

The present invention relates to a video surveillance system and, more particular, to a video surveillance system which records video signals that are compressed at a selectively controlled compression ratio on a record medium.

As is known, a video surveillance system generally is comprised of a video camera and a video tape recorder in which a video signal produced by the camera is recorded on a magnetic tape in the video tape recorder. Such devices further are operable to record the video signal intermittently on the magnetic tape so as to extend the recording time thereof. For example, if a video surveillance system records one frame of the video signal per minute, then sixty hours worth of surveillance could be recorded on a standard two-hour video tape. Such devices further are operable to switch to a continuous recording mode when an "incident" occurs, for example, as when a motion detector is triggered (i.e., detects motion) so as to record a standard video signal (i.e., 30 frames per second) during the duration of the "incident".

One shortcoming of typical surveillance systems is that they do not record a video signal that is useful for inspection purposes for those periods of time at which the video signal is being recorded intermittently. Even though such devices attempt to switch to a continuous recording mode when a particular incident occurs (or when a particular condition exists), there may be other times when such devices are intermittently recording at which it is desired to view, analyze, or otherwise process that which the surveillance system is observing.

OBJECTS OF THE INVENTION

Therefore, it is an object of the present invention to provide apparatus and method for recording a video signal on a record medium which overcome the shortcomings of the above-described devices.

Another object of the present invention is to provide apparatus and method for recording a video signal on a record medium which are operable to continuously record the video signal while at the same time extend the recording time of that record medium beyond its standard recording time capacity.

A further object of the present invention is to provide a surveillance and recording technique which both continuously and intermittently records compressed video signals using a compression technique which extends the recording time of a record medium.

Various other objects, advantages and features of the present invention will become readily apparent to those of ordinary skill in the art and the novel features will be particularly pointed out in the appended claims.

SUMMARY IN THE INVENTION

In accordance with one embodiment of the present invention, apparatus and method are provided for picking-up an image to produce a video signal corresponding thereto, compressing the video signal at a selected one of a plurality of different compression ratios, recording the compressed video signal on a record medium, and switching the compression ratio used during compression from a relatively high compression ratio to a relatively low compression ratio upon the occurrence of a predetermined condition.

As one aspect of the present invention, the occurrence of the predetermined condition is sensed and a detection signal indicating the occurrence of the predetermined condition is produced, and switching of the compression ratio is carried out in response to the detection signal.

As another aspect of the present invention, the compressed video signal is continuously recorded on the record medium (e.g., 30 frames/second) upon the occurrence of the predetermined condition, and the compressed video signal is intermittently recorded (e.g., 1 frame/second) on the record medium in the absence of the occurrence of the predetermined condition.

As yet a further aspect of the present invention, the video signal is compressed at a relatively low compression ratio (e.g., using a first quantization table) in a first compression mode, is compressed at a middle compression ratio (e.g., using a second quantization table) in a second compression mode, and is compressed at a relatively high compression ratio (e.g., using a third quantization table) in a third compression mode, and the compression mode is established in response to the detection of a predetermined condition or conditions.

As yet another aspect of the present invention, a clock signal which represents a current time is provided, and the compression ratio is switched to the relatively low compression ratio when the clock signal represents a time in a predetermined time period.

Still yet a further aspect of the present invention, a plurality of images are picked-up to produce a plurality of video signals, and the video signals are compressed at respective selected compression ratios, and all of the compressed video signals are multiplexed to produce a single multiplexed signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 3A to 3C are quantization tables used by the quantization circuit shown in FIG. 2;

DETAILED DESCRIPTION OF CERTAIN PREFERRED EMBODIMENTS

Figure 1:
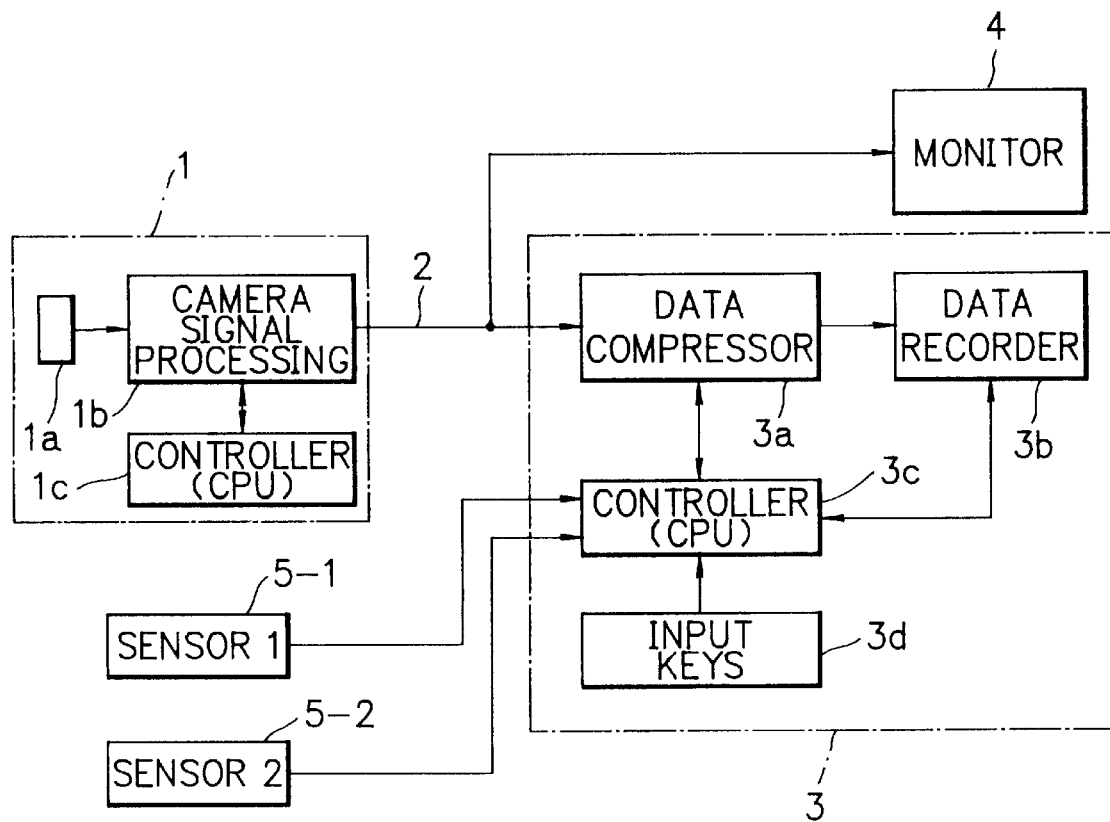
FIG. 1 is a block diagram of a video surveillance system in accordance with the present invention.

Referring now to the drawings, and particularly to FIG. 1 thereof, a block diagram of the video surveillance system in accordance with the present invention is shown. The video surveillance system is comprised of a video camera 1, a video tape recorder 3 and plural sensors 5–1 and 5–2. The video camera 1, which is comprised of a charged coupled device (CCD) 1a, a processing circuit 1b and a controller 1c (e.g., a central processing unit), converts a video image that is "picked up" (imaged) by CCD 1a therein to a "raw" video signal and converts (i.e., processes) the raw video signal into a standard video signal in processing circuit 1b in response to control signals supplied from controller 1c. Processing circuit 1b further is operable to add to the video signal date and time data which represent the date and time at which the image represented by the video signal is imaged. Camera 1 supplies the video signal, including the date and time data, to video tape recorder 3 which compresses and records the video signal in a manner to be discussed. The video signal also can be supplied to a monitor 4 for viewing thereof, although such a monitor in no way forms a part of the present invention. Further, video camera 1 may be any standard surveillance or other type of video camera and since the function and operation of such cameras are well known in the art, further description thereof is omitted herein except when necessary for an understanding of the present invention.

Video tape recorder 3 is comprised of a data compressor 3a, a data recorder 3b, a controller 3c and an input device 3d. Video camera 1 supplies the video signal over a cable 2 (or transmits the signal) to data compressor 3a which compresses the video signal at a particular compression ratio as controlled by controller 3c (to be discussed) and the compressed video signal is stored on a record medium, for example, a magnetic tape, a magneto-optical compact disk, a random access memory, etc., in data recorder 3b. Further, data recorder 3b is operable in a continuous recording mode to continuously record the video signal (i.e., 30 frames/second) and also is operable in an intermittent recording mode to intermittently record the video signal (e.g., 1 frame/second), as will be discussed., Sensor 1 (5–1) and sensor 2 (5–2) of the video surveillance system represent condition detecting devices which detect the existence (or occurrence) of a specific condition. That is, each sensor may be a motion detector, a light detector, a sound detector, a mechanical switch, a heat (temperature) sensor or any other desired type of detector. For example, sensor 2 (5–2) may be a motion detector that is located in the immediate vicinity of a bank vault (or cash register) and sensor 1 (5–1) may be a mechanical switch that is coupled to the door of the bank vault (or the door of the cash register) and which detects when the bank vault (or door) is opened. Sensor 1 and sensor 2 each produce a respective detection signal which indicates the occurrence (or non-occurrence) of a particular event (or condition) and the two detection signals are supplied to controller 3c which, in response thereto, generates a compression control signal and a recording mode control signal. In accordance with the present invention, when a particular condition exists (or event occurs) as indicated by the detection signals supplied from sensors 1 and 2, controller 3c generates an appropriate compression control signal which is supplied to data compressor 3a and which controls the data compressor to compress the supplied video signal at either a high, middle or low compression ratio. For example, data compressor 3a is controlled to compress the video signal at a high compression ratio when neither sensor 1 or 2 is triggered (i.e., detects the occurrence of a particular condition or event), is controlled to compress the video signal at a middle compression ratio when only sensor 2 is triggered, and is controlled to compress the video signal at a low compression ratio when sensor 1 is triggered (e.g., regardless of whether sensor 2 is triggered). Of course, data compressor 3a can be controlled to compress the video signal at the middle compression ratio when either, but not both, sensor 1 or sensor 2 is triggered and be controlled to compress the video signal at the low compression ratio only when both sensors 1 and 2 are triggered. The above conditions are only illustrative and it is appreciated that any one of the three or even more compression ratios can be selected in response to any one of a number of different conditions as detected by any number of sensors.

As mentioned above, controller 3C also establishes the recording mode of data recorder 3b from the detection signals supplied from sensors 1 and 2. For example, controller 3c generates an appropriate recording mode control signal which controls data recorder 3b to intermittently record the video signal at an intermittent rate of, for example, one frame per minute when neither sensor 1 nor sensor 2 is triggered, and generates an appropriate recording mode control signal which controls data recorder 3b to continuously record the video signal when either (or both) sensor 1 or sensor 2 is triggered. Generally, a user establishes via input device 3d the various conditions and requirements for the various compression and/or recording modes. For example, a user can program controller 3c such that the video signal always is continuously recorded on the magnetic tape.

Figure 2:
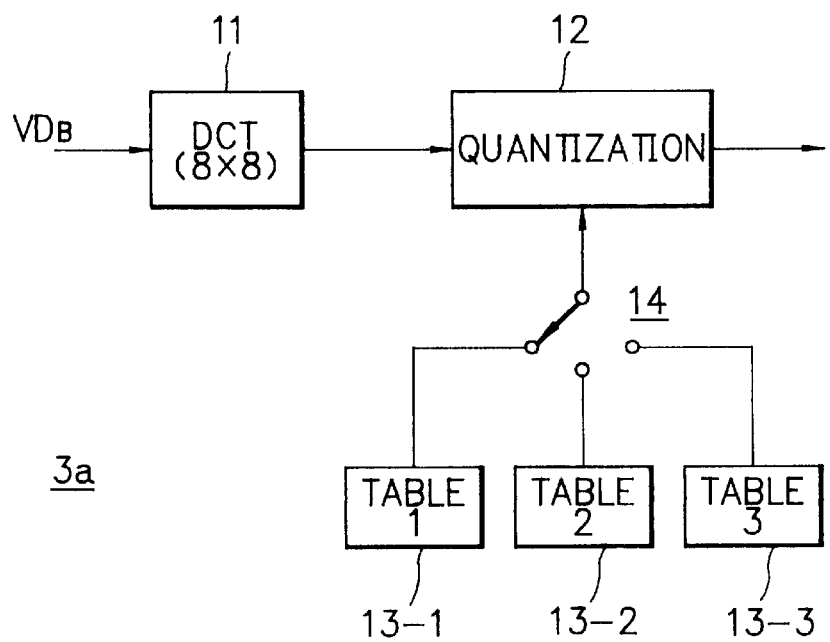
FIG. 2 is a block diagram of the data compressor shown in FIG. 1.

Referring next to FIG. 2, a block diagram of data compressor 3a is shown in which the data compressor is comprised of a discrete cosine transformation (DCT) circuit 11, a quantization circuit 12 and plural quantization tables 13–1, 13–2 and 13–3. The video signal supplied from the video camera is discrete cosine transformed in circuit 11 which produces blocks (e.g., each block is 8 lines by 8 pixels) of video data and the blocks of video data are quantized in quantization circuit 12 using a selected one of the quantization tables 13–1, 13–2 and 13–3 as controlled by a switch 14. In accordance with the present invention, controller 3c, in response to the detection signals, generates a compression control signal which controls switch 14 to switch between one of the three tables 13–1, 13–2 and 13–3. When a high compression ratio is selected (by controller 3c), switch 14 is controlled to switch to table 3 (13–3); when the middle compression ratio is selected, switch 14 is controlled to switch to table 2 (13–2); and when the low compression ratio is selected, switch 14 is controlled to switch to table 1 (13–1). FIGS. 3A, 3B and 3C show exemplary values of tables 1, 2 and 3, respectively. Thus, the video signal is highly compressed when table 1 is selected, the video signal is compressed at a middle level when table 2 is selected, and the video signal is compressed at a relatively low level when table 3 is selected. Since the operation of a quantization circuit, such as shown in FIG. 2, is well known in the art, further description thereof is omitted herein except where necessary for an understanding of the present invention.

Data compressor 3a compresses the video signal in the manner previously discussed and supplies the compressed video signal, along with other data representing the type of compression, etc., to data recorder 3b which records, either continuously or intermittently, the compressed video signal on a magnetic tape. Data compressor 3a also is further operable to process the video signal in other known manners (e.g., error detection/correction, variable length encoding, etc.) as is well known in the art.

Figure 4:
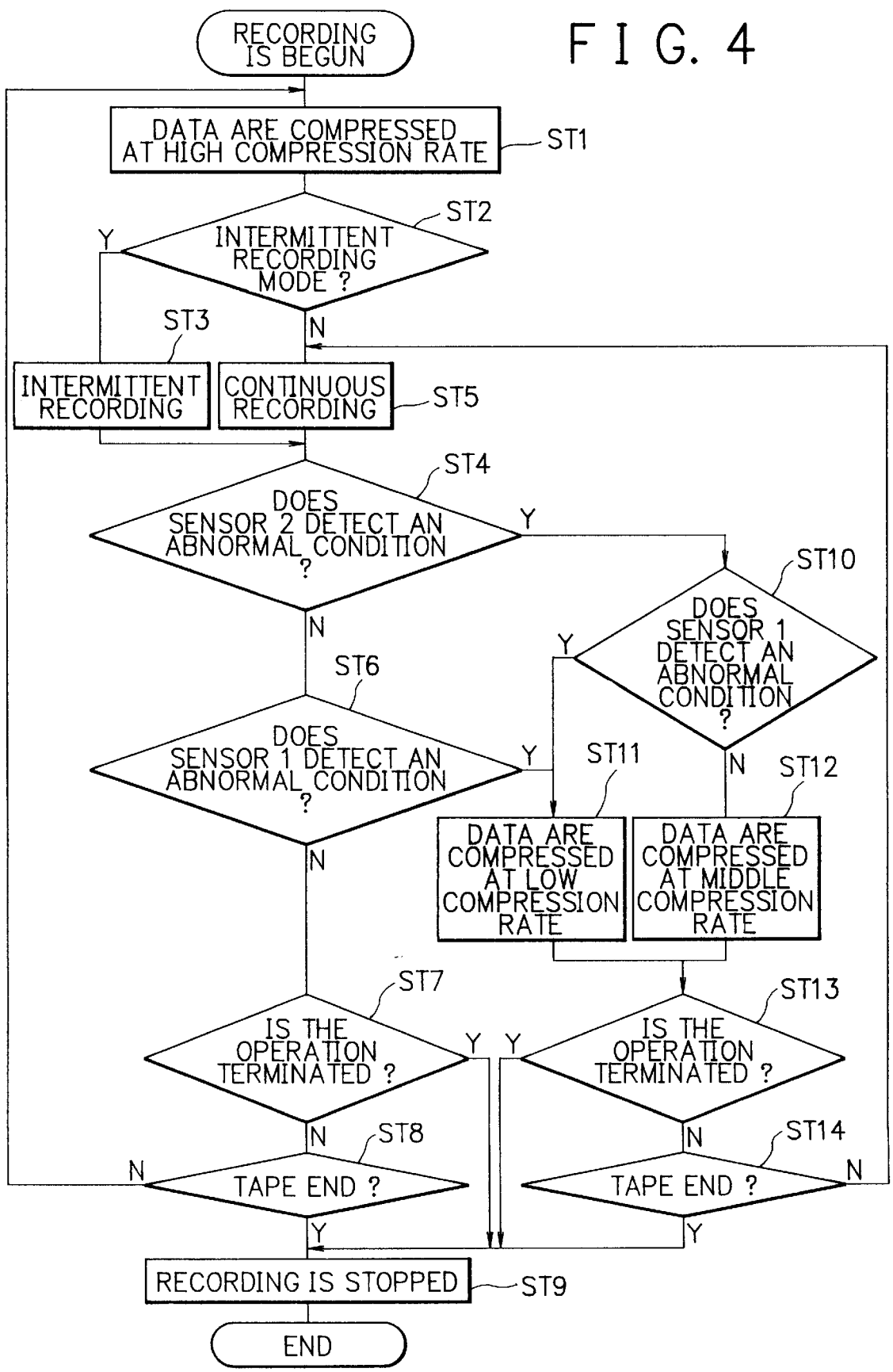
FIG. 4 is a flow chart of the operation of the present invention.

FIG. 4 is a flow chart of the operation of the video surveillance system, particularly controller 3c, of the present invention. When recording is initiated, for example, by a user via input device 3d, the data compression mode of compressor 3a initially is established at the high compression ratio (by means of the compression control signal) at instruction ST1. It is then determined, at inquiry ST2, whether the surveillance device is programmed (e.g., via input device 3d) to selectively operate in either the intermittent and continuous recording modes or to operate only in the continuous recording mode. If the device is programmed to record in either mode, the process proceeds to instruction ST3 whereat data recorder 3b is controlled to record in the intermittent recording mode, but if the device is programmed to record only in the continuous recording mode, then data recorder 3b is controlled to record in the continuous recording mode at instruction ST5. It is then determined, at inquiry ST4, if sensor 2 (5–2) is triggered (detects an "abnormal" condition) and if not, it is determined, at inquiry ST6, if sensor 1 (5–2) is triggered. If sensor 1 also is not triggered, then the process proceeds to inquiry ST7 whereat it is determined if the recording operation has been terminated, either automatically or manually by a user. If the recording operation is terminated, then data recorder 3b is controlled to stop recording at instruction ST9 and the surveillance operation is complete. If, however, the recording operation is not terminated, then it is determined, at inquiry ST8, if the end of the magnetic tape has been reached, and if so, the recording operation is terminated at instruction ST9. If the end of the tape has not been reached, the process returns back to instruction ST1. Thus, the video signal is compressed at the high compression ratio and is recorded intermittently, if selected by the user, on the magnetic tape when neither sensor 1 or sensor 2 is triggered. However, if it is necessary to provide continuous recording throughout the entire surveillance process, the video surveillance system of the present invention is operable to be controlled to always continuously record the video signal independent of the surrounding circumstances. In this instance, the recording length of the magnetic tape (or other record medium) is extended beyond its standard recording time capacity since the video signal is highly compressed at designated times.

Returning to inquiry ST4, if sensor 2 is triggered (detects an "abnormal" condition), then it is determined at inquiry ST10 if sensor 1 is triggered. If sensor 1 is not triggered, as determined at inquiry ST10, then the data compression mode of compressor 3a is established at the middle compression ratio at instruction ST12. However, if sensor 1 is triggered, then the data compression mode of compressor 3a is established at the low compression ratio at instruction ST11. Similarly, if sensor 2 is not triggered, as determined at inquiry ST4, and sensor 1 is triggered, as determined at inquiry ST6, the data compression mode of compressor 3a is established at the low compression ratio at instruction ST11.

Then, after the data compression mode is established at the low compression ratio (at instruction ST11) or at the middle compression ratio (at instruction ST12), it is determined if the recording operation has been terminated at inquiry ST13. If the recording operation is terminated, then data recorder 3b is controlled to stop recording the video signal at instruction ST9 and the recording is complete. If, however, the recording operation is not terminated, it is determined, at inquiry ST14, if the end of the magnetic tape has been reached, and if so, the recording operation is terminated at instruction ST9. If the end of the tape has not been reached, then the process proceeds to instruction ST5 whereat data recorder 3b is controlled to record in the continuous recording mode. Thus, the video signal is compressed at the middle compression ratio and continuously recorded on the magnetic tape when only sensor 2 is triggered, and the video signal is compressed at the low compression ratio and continuously recorded on the magnetic tape when sensor 1 is triggered, whether or not sensor 2 is triggered.

Figure 5:
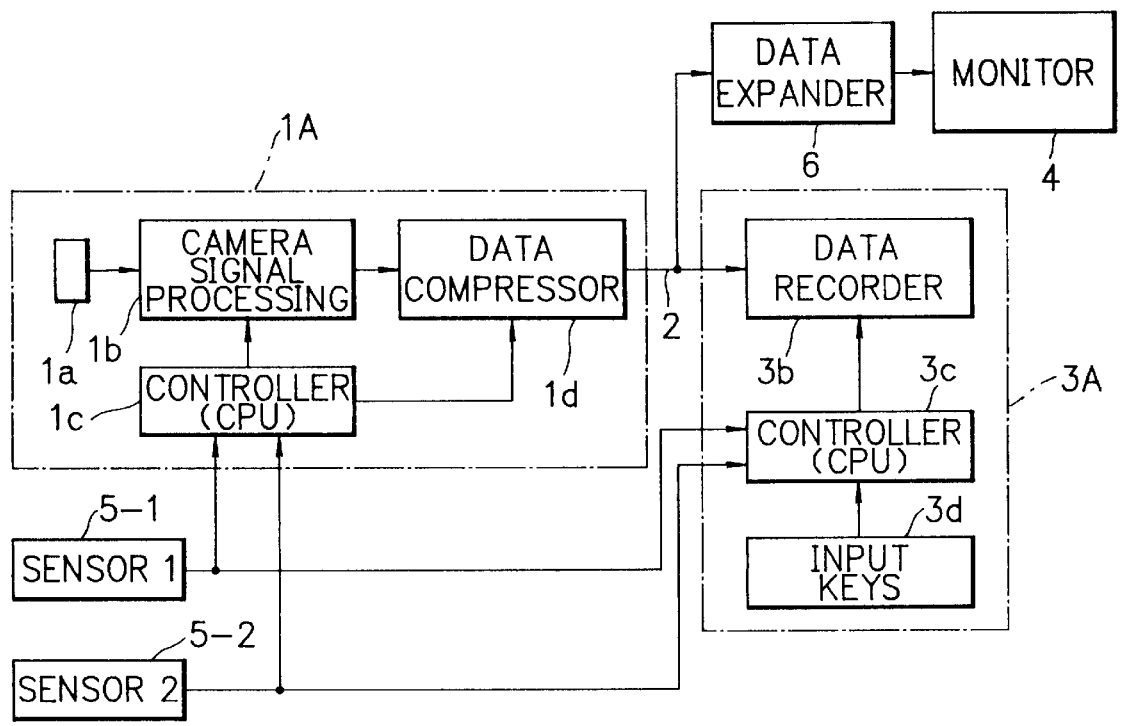
FIG. 5 is a block diagram of the video surveillance system in accordance with another embodiment of the present invention.

Referring next to FIG. 5, a block diagram of the video surveillance system in accordance with another embodiment of the present invention is shown. The video surveillance system is comprised of a video camera 1A, a video tape recorder 3A and sensors 5–1 and 5–2. Video camera 1A is comprised of a CCD 1a, a signal processing circuit 1b, a controller 1c and a data compressor 1d, and video tape recorder 3A is comprised of a data recorder 3b, a controller 3c and an input device 3d. As seen from a comparison of the devices shown in FIGS. 1 and 5, the video surveillance system of FIG. 5 is similar to the video surveillance system of FIG. 1 except that data compression is carried out in the video camera itself in the embodiment shown in FIG. 5. Further, controller 1c in FIG. 5 is operable to generate the compression control signal, previously discussed, from the detection signals supplied from sensors 5–1 and 5–2. Also, since the video signal is compressed in video camera 1A, the transmission rate of cable 2 need not be as high as that shown in the embodiment of FIG. 1. Or, a higher bit rate signal can be transmitted or supplied on cable 2 in FIG. 5, as compared to the device of FIG. 1, since the video signal is compressed before it is supplied thereon.

The video surveillance device shown in FIG. 5 also may include a data expander 6 which expands the compressed video data supplied on cable 2 before supplying the video signal to monitor 4. The video surveillance system shown in FIG. 5 operates in a manner substantially similar to that previously discussed with reference to FIGS. 1–4 and, thus, further description of the operation of the device of FIG. 5 is omitted herein.

Figure 6:
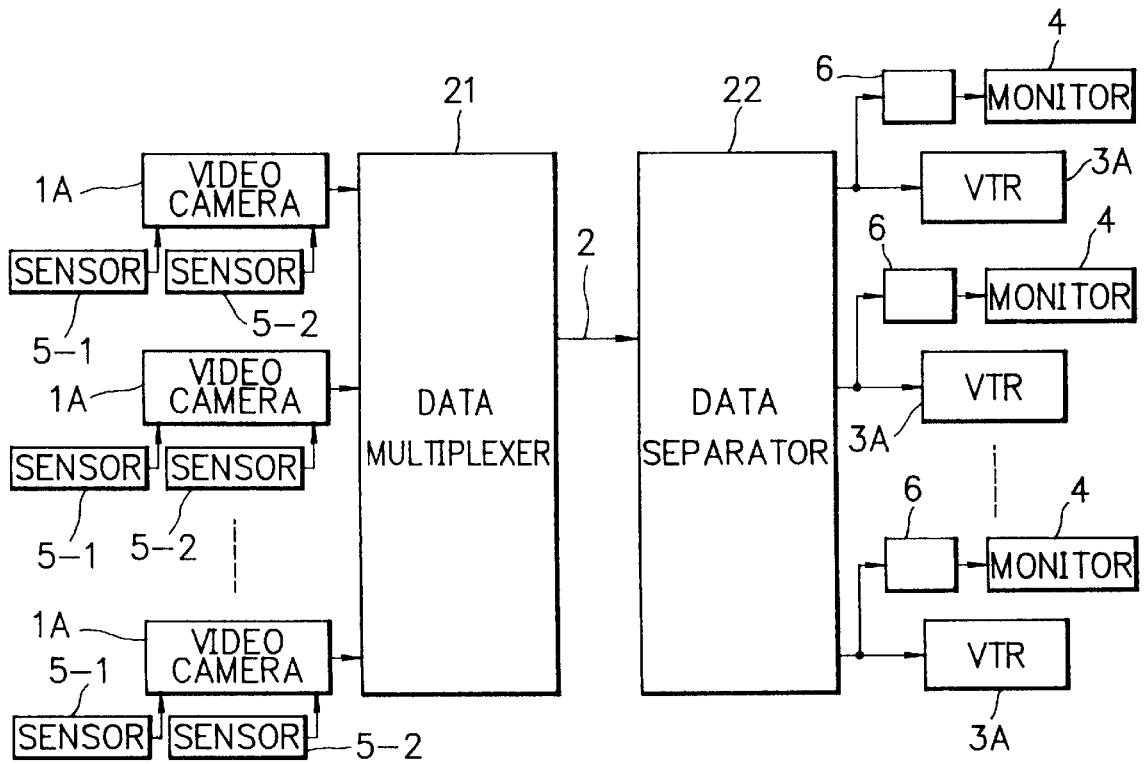
FIG. 6 is a block diagram of the video surveillance system in accordance with a further embodiment of the present invention.

FIG. 6 is a block diagram of the video surveillance system in accordance with a further embodiment of the present invention and which is comprised of plural sets of video cameras 1A, sensor pairs 5–1, 5–2, and video tape recorders 3A. The video surveillance system also is comprised of a data multiplexer 21 and a data separator (or demultiplexer) 22. Detection signals generated from each set of sensors 5–1 and 5–2 are supplied to a respective one of the video cameras 1A as well as a respective one of the video tape recorders 3A (the supply of the detection signals to each VTR 3A is not shown in FIG. 6). Each video camera 1A includes a CCD 1a, a signal processor circuit 1b, a controller 1c and a data compressor 1d, such as shown in the embodiment of FIG. 5, and each video camera 1A operates in a manner substantially similar to that previously discussed in that each camera images a respective image, produces a respective video signal from the respective image, and compresses the respective video signal.

In accordance with the present invention, each video camera 1A receives respective detection signals from the sensors and the respective video signals are compressed at particular compression ratios independent of the other compression ratios. That is, one of the video cameras may compress the video signal generated therein at a high compression ratio while another video camera compresses the video signal generated therein at a low (or middle) compression ratio. Thus, each camera/sensors/VTR set operates to compress and record a respective video signal without regard to the compression ratio and/or recording mode of the other camera/sensors/VTR sets.

Each video camera 1A generates and compresses a respective video signal, as previously discussed, and all of the compressed video signals are supplied to data multiplexer 21 which multiplexes the supplied signals into packs of data. Header data optionally may be added to each of the data packets to identify the data therein in multiplexer 21 and the packets of data are supplied (or transmitted) on a cable 2 to data separator 22 which separates (i.e., demultiplexes) the packets of data to recover the respective compressed video signals. Each recovered compressed video signal is supplied to a respective video tape recorder 3A which records the supplied signal, either intermittently or continuously, on a respective record medium. As previously mentioned, the recording mode (intermittent and continuous) of each video tape recorder is controlled by the respective detection signals.

In accordance with the present invention, since the video signals generated in the video cameras are compressed prior to being multiplexed and transmitted on cable 2, and since the compression ratios of the respective video signals may be different and it can be expected that some of the video signals are being highly compressed, cable 2 is able to transmit a greater number of video signals generated from the multiple video cameras than it normally would be expected to transmit. That is, while some video signals are compressed at a low compression ratio, other video signals produced by other video cameras are compressed at a high compression ratio, and, thus, a larger number of video signals can be transmitted on cable 2. Alternatively, the compression ratio at which each video signal is compressed may also be dependent upon (controlled by) the total data rate of the multiplexed signal so as to ensure that the maximum transmission rate of cable 2 is not exceeded.

The video surveillance system of FIG. 6 also may include a plural number of expander circuits 6 each of which expands a respective compressed video signal output from data separator 22 before supplying the respective signal to a respective monitor 4. In an alternative embodiment, the multiplexed signals supplied on cable 2 are supplied to a single video tape recorder which records on a single record medium the supplied signal including all of the compressed video signals.

Figure 7:
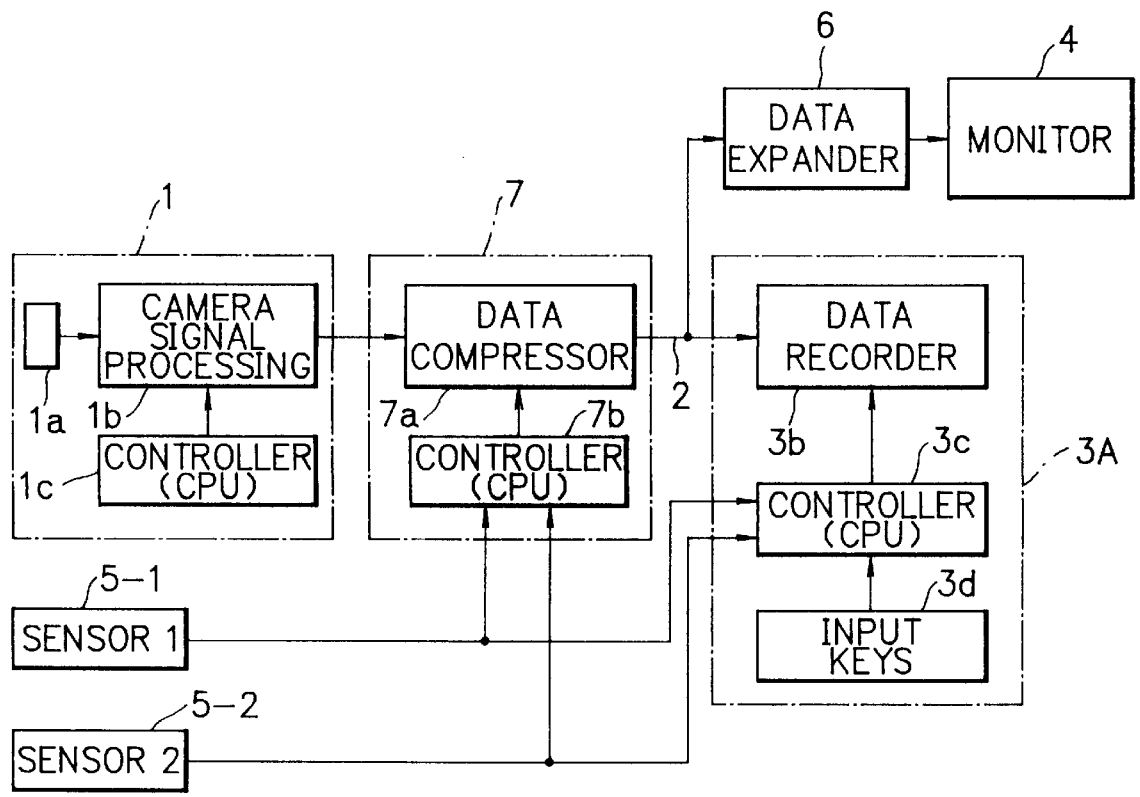
FIG. 7 is a block diagram of the video surveillance system in accordance with yet another embodiment of the present invention.

FIG. 7 is a block diagram of the video surveillance system in accordance with yet another embodiment of the present invention and which is comprised of a video camera 1, a video tape recorder 3A, sensors 5–1 and 5–2, and a compression circuit 7. Video camera 1 has been discussed previously with reference to FIG. 1 and video tape recorder 3A has been discussed previously with reference to FIG. 5. However, compression circuit, which is comprised of a data compressor 7a and a controller 7b, is external to both the video camera and the video tape recorder. The video signal output from video camera 1 is supplied to data compressor 7a which compresses the video signal at a compression ratio as controlled by controller 7b and which supplies the compressed (and otherwise processed) video signal to video tape recorder 3A which records the video signal, either intermittently or continuously, on a record medium. Data compressor 7a, while operating as an external device, operates in a manner substantially similar to data compressor 1d, and, thus, further description thereof is omitted herein. Controller 7b operates only to control data compressor 7a so as to establish the compression ratio at which the video signal is compressed and is substantially similar to the controllers previously discussed.

As previously discussed, each of the embodiments discussed above utilize two sensors 5–1 and 5–2 to detect the occurrence of two events (or existence of two conditions) and utilize three different compression ratios depending on whether those sensors are triggered. However, two, four or other number of compression ratios also may be utilized and one, three, four or more than four sensors may be utilized to detect the occurrence of any number of events. Still further, various intermittent modes of the video tape recorder may be utilized, for example, a first intermittent mode where 10 frames per second are recorded, a second intermittent mode where 5 frames per second are record, a third intermittent mode where 1 frame every 2 seconds is recorded, etc., may be employed. In addition, an intermittent recording mode may be employed even for compression ratios other than the relatively high compression ratio. Still further, one of the compression modes may involve not compressing a video signal as when the highest quality video signal must be recorded.

Figure 8:
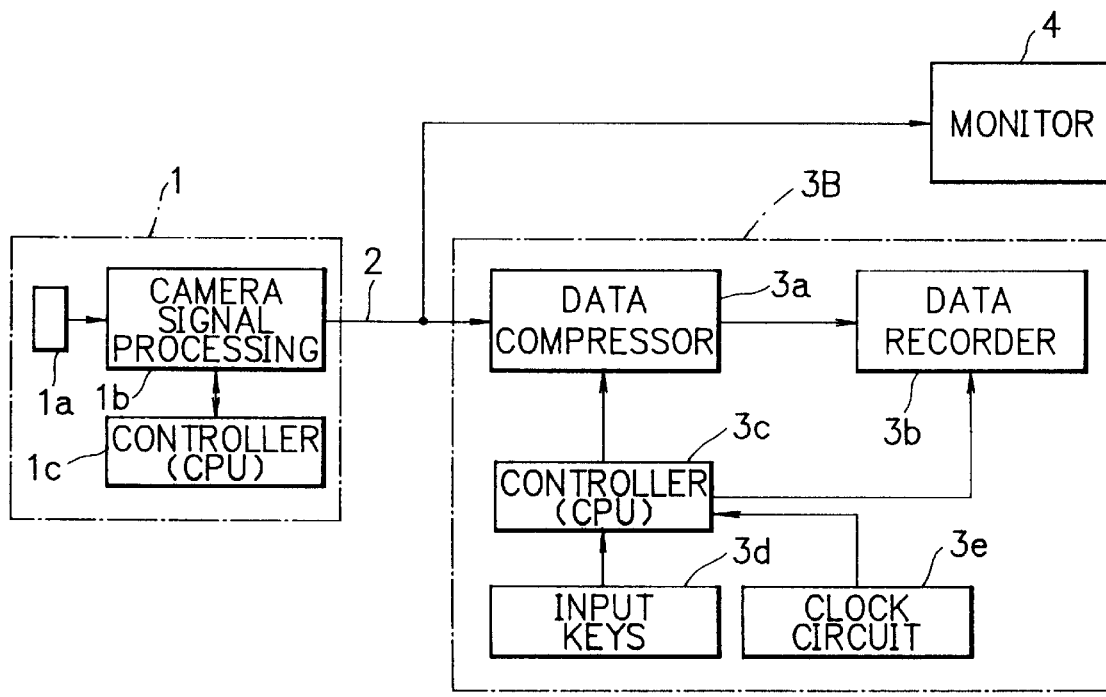
FIG. 8 is a block diagram of the video surveillance system in accordance with still yet a further embodiment of the present invention.

FIG. 8 is a block diagram of the video surveillance system in accordance with still yet a further embodiment of the present invention and which includes a video camera 1 which is substantially similar to that previously described with reference to FIG. 1. The video surveillance system of FIG. 8 further includes a video tape recorder 3B and optionally may include a monitor 4. Video camera 1 supplies a generated video signal to video tape recorder 3B and to monitor 4 which displays the video signal thereon. Video tape recorder 3B includes a data compressor 3a, a data recorder 3b, a controller 3c, an input device 3d, as well as a clock circuit 3e. In accordance with this embodiment of the present invention, the video surveillance system does not include sensors and, instead, includes clock circuit 3e which generates time data. A user, via input device 3d, indicates (establishes) a first time period Ta at which the video signal is compressed at the low compression ratio, and indicates a second time period Tb at which the video signal is compressed at the middle compression ratio. Then, and in accordance with the present invention, the video signal output from video camera 1 is compressed (as controlled by a compression control signal supplied from controller 3c, previously discussed) at the low compression ratio when the current time, as indicated by the time data supplied from clock circuit 3e, is during time period Ta. Similarly, the video signal output from video camera 1 is compressed at the middle compression ratio when the current time is during time period Tb. Then, the video signal, when compressed at either the middle or low compression ratios, is continuously recorded on a record medium in data recorder 3b.

In accordance with the present invention, when the current time is not during either time periods Ta or Tb, controller 3c controls data compressor 3a to compress the video signal at the high compression ratio and controls data recorder 3b to intermittently record the compressed video signal on the record medium. Of course, a user can program the device to always continuously record the video signal, as previously discussed.

A user can select two different time periods Ta and Tb which represent different time periods in each day or which represent respective times during selected days in each week, month or year. For example, time period Ta can include the time period of 4:00 pm to 8:00 pm monday through friday and also include the time period of 9:00 pm to 11:00 pm on saturday and sunday. Thus, it is seen that time period Ta can represent any selected time of day on any day. Time period Tb similarly is established. Of course, a third or fourth time period can be established at which the video signal is compressed at still yet different compression ratios.

In an alternative embodiment, the video surveillance system can include both a clock circuit and sensors in which the compression mode is a function of both the outputs of each of the sensors and the time as indicated by the time data.

Figure 9:
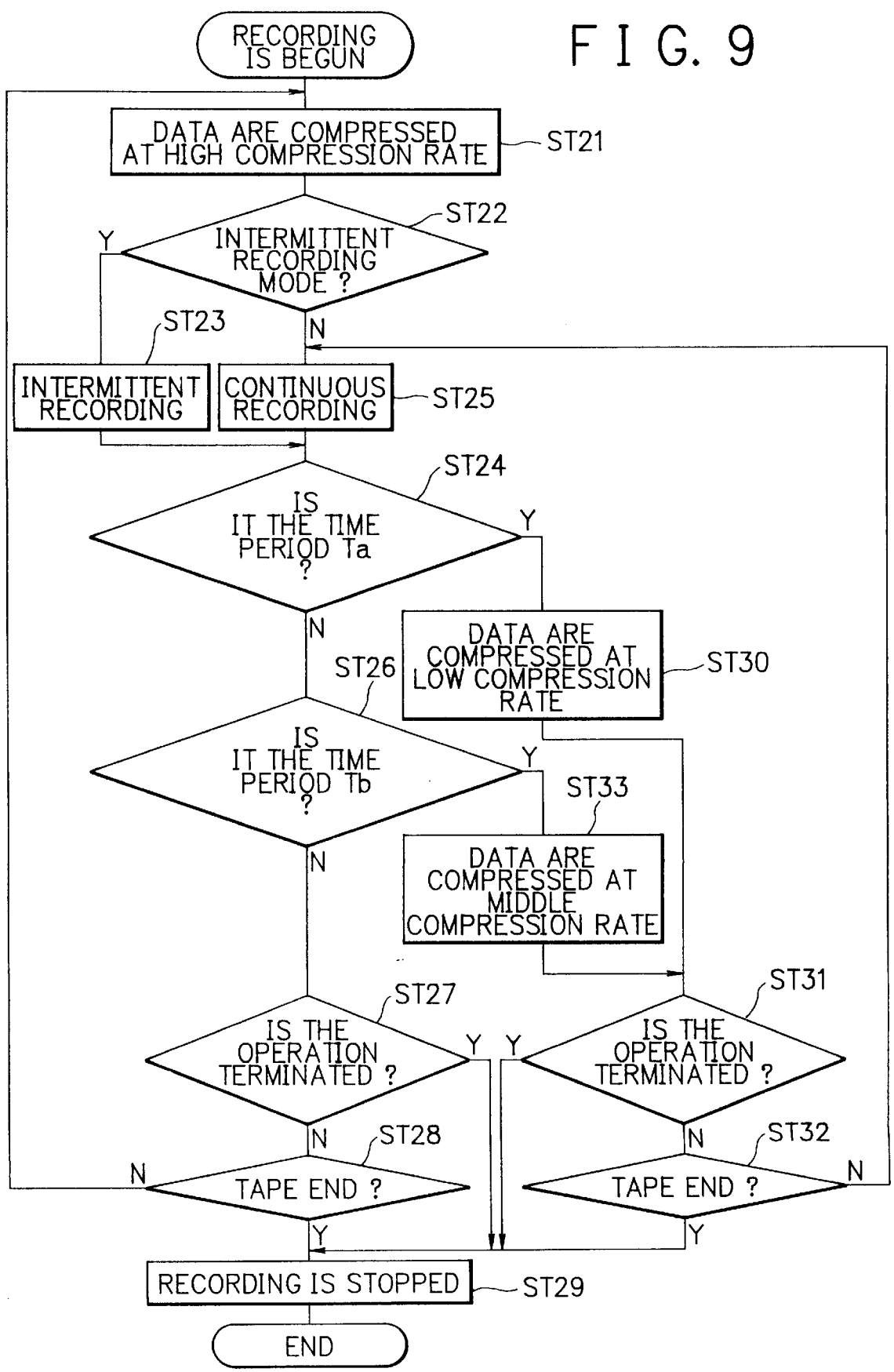
FIG. 9 is a flow chart of the operation of the video surveillance system shown in FIG. 8.

FIG. 9 is a flow chart of the operation of the video surveillance system shown in FIG. 8. When recording is initiated, the data compression mode of compressor 3a initially is established at the high compression ratio at instruction ST21. It is determined, at inquiry ST22, whether the surveillance device is programmed to selectively operate in either the intermittent and continuous recording modes or to operate only in the continuous recording mode. If the device is programmed to record in either mode, the process proceeds to instruction ST23 whereat data recorder 3b is controlled to record in the intermittent recording mode, but if the device is programmed to record only in the continuous recording mode, then data recorder 3b is controlled to record in the continuous recording mode at instruction ST25. It is then determined, at inquiry ST24, if the current time (as indicated by the time data from clock circuit 3e) is during the first time period ta, and if not, it is determined, at inquiry ST26, if the current time is during the second time period tb. If the current time is not during the second time period, then the process proceeds to inquiry ST27 whereat it is determined if the recording operation has been terminated. If the recording operation is terminated, then data recorder 3b is controlled to stop recording at instruction ST29 and the surveillance operation is complete. If, however, the recording operation is not terminated, then it is determined, at inquiry ST28, if the end of the magnetic tape has been reached, and if so, the recording operation is terminated at instruction ST29. If the end of the tape has not been reached, the process returns back to instruction ST21. Thus, the video signal is compressed at the high compression ratio and is recorded intermittently, if selected by the user, on the magnetic tape when the current time is neither during time periods Ta or Tb.

Returning to inquiry ST24, if the current time is during the first time period Ta, then the data compression mode of compressor 3a is established at the low compression ratio at instruction ST30. However, if the current time is not during the first time period Ta but is during the second time period Tb, as indicated at inquiry ST26, the data compression mode of compressor 3a is established at the middle compression ratio at instruction ST33.

Then, after the data compression mode is established at the low compression ratio (at instruction ST30) or at the middle compression ratio (at instruction ST33), it is determined if the recording operation has been terminated at inquiry ST31. If the recording operation is terminated, then data recorder 3b is controlled to stop recording the video signal at instruction ST29 and the recording is complete. If, however, the recording operation is not terminated, it is determined, at inquiry ST32, if the end of the magnetic tape has been reached, and if so, the recording operation is terminated at instruction ST29. If the end of the tape has not been reached, then the process proceeds to instruction ST25 whereat data recorder 3b is controlled to record in the continuous recording mode. Thus, the video signal is compressed at the low compression ratio and continuously recorded on the magnetic tape during the first time period Ta, and the video signal is compressed at the middle compression ratio and continuously recorded on the magnetic tape during the second time period Tb.

It is seen from the above discussions of the various embodiments of the present invention that the video signal is compressed at a compression ratio that is dependent upon the various outputs of the sensors, or that is dependent upon the time of day. Compressing the video signal at different ratios results in the substantial extending of the recording time of a standard two-hour (or 3 hour, etc.) length magnetic tape (or other suitable record medium including magneto-optical compact disks, etc.) since it can be expected that the highest compression ratio will be utilized for a substantial portion of the recording time. Still further, due to such a compression technique, it is not necessary to intermittently record the video signal to extend the recording time of the magnetic tape and, thus, continuous recording can be utilized throughout the entire recording process to ensure that every moment of surveillance is recorded (i.e., at 30 frames/ second) to provide a recorded video signal that is useful for inspection, viewing and/or processing purposes. However, if continuous recording is not needed for particular instances (e.g., when no sensor is triggered), intermittent recording can be selected to further extend the recording length of a record medium.

While the present invention has been particularly shown and described in conjunction with preferred embodiments thereof, it will be readily appreciated by those of ordinary skill in the art that various changes may be made without departing from the spirit and scope of the invention. For example, although the present invention has been described as a video surveillance system intended for, for example, security purposes, the present invention is not limited to only such devices and may be applied to other types of systems including safety devices, data accumulation devices, or any other device which detects a change in physical circumstances.

As another example, although the present discussion is directed to changing a quantization table to vary the compression ratio at which a video signal is compressed, other compression techniques may be utilized to produce the same result. For example, various intraframe/interframe encoding techniques may be utilized in place of or in addition to the compression technique discussed herein.

Therefore, it is intended that the appended claims be interpreted as including the embodiments described herein, the alternatives mentioned above, and all equivalents thereto.

What is claimed is:

1. Apparatus for recording a video signal, said apparatus being operable in an intermittent mode and a continuous mode, said apparatus comprising:

image pick-up means for picking-up an image to produce a video signal corresponding thereto;

compression means operable at selectively different compression ratios and having first, second, and third quantization tables for compressing said video signal to produce a compressed video signal, said compression means utilizing said first, second, and third quantization tables for operations involving a low compression ratio, a middle compression ratio and a high compression ratio, respectively, such that the first and/or second quantization tables are utilized when operating in said continuous mode to obtain a low and/or middle level of compression and the third quantization table is utilized when operating in said intermittent mode to obtain a high level of compression;

recording means for recording the compressed video signal on a record medium; and control means for automatically switching the compression ratio of said compression means from the relatively high compression ratio to the relatively low compression ratio upon the occurrence of a predetermined condition.

2. The apparatus of claim 1, further comprising sensor means for sensing the occurrence of said predetermined condition and producing a detection signal indicating the occurrence of the predetermined condition; and wherein said control means switches the compression ratio in response to the detection signal.

3. The apparatus of claim 1, wherein said recording means is selectively controllable to continuously record the compressed video signal in a continuous recording mode and to intermittently record the compressed video signal in an intermittent recording mode; and wherein said control means is operable to control the recording mode of said recording means to record in the continuous recording mode upon the occurrence of the predetermined condition.

4. The apparatus of claim 3, wherein said control means is operable to control said recording means to record in the intermittent recording mode in the absence of the predetermined condition.

5. The apparatus of claim 1, wherein the relatively low compression ratio corresponds to a first compression mode, the middle compression ratio corresponds to a second compression mode, and the relatively high compression ratio corresponds to a third compression mode; and wherein said control means establishes the compression mode of the compression means.

6. The apparatus of claim 5, wherein said compression means includes quantization means for quantizing the video data using a first quantization table in the first compression mode, using a second quantization table in the second compression mode, and using a third quantization table in the third compression mode.

7. The apparatus of claim 5, further comprising sensor means for sensing the occurrence of at least one predetermined condition and producing a detection signal indicating the occurrence of said at least one predetermined condition; and wherein said control means establishes the compression mode of the compression means in accordance with the detection signal.

8. The apparatus of claim 7, wherein said sensor means includes first sensor means for sensing the occurrence of a first predetermined condition and second sensor means for sensing the occurrence of a second predetermined condition, and said detection signal indicates the occurrences of each said first and second predetermined conditions.

9. The apparatus of claim 8, wherein said control means controls the compression means to operate in the first compression mode when the detection signal indicates the occurrence of said first predetermined condition, controls the compression means to operate in the second compression mode when the detection signal indicates the occurrence of only said second predetermined condition, and controls the compression means to operate in the third compression mode when the detection signal indicates the occurrence of neither the first or second predetermined conditions.

10. The apparatus of claim 9, wherein said recording means is selectively controllable to continuously or intermittently record the compressed video signal; and said control means is operable to control said recording means to continuously record the video signal when the detection signal indicates the occurrence of either said first or second predetermined conditions and to control said recording means to intermittently record the video signal when the detection signal indicates the occurrence of neither said first or second predetermined conditions.

11. Apparatus for recording a video signal, comprising:
image pick-up means for picking-up an image to produce a video signal corresponding thereto;

compression means operable at selectively different compression ratios for compressing said video signal to produce a compressed video signal;

recording means for recording the compressed video signal on a record medium;

control means for automatically switching the compression ratio of said compression means from a relatively high compression ratio to a relatively low compression ratio upon the occurrence of a predetermined condition; and means for providing a clock signal representing a current time; and wherein said predetermined condition corresponds to a predetermined time period such that said control means is operable to switch the compression ratio of said compression means from the relatively high compression ratio to the relatively low compression ratio when said clock signal represents a time in said predetermined time period.

12. The apparatus of claim 11, wherein said predetermined condition corresponds to first and second predetermined time periods; and said control means is operable to establish the compression ratio of said compression means to the relatively low compression ratio when said clock signal represents a time in said first predetermined time period, to establish the compression ratio of said compression means to a middle compression ratio when said clock signal represents a time in said second predetermined time period, and to establish the compression ratio of said compression means to the relatively high compression ratio when said clock signal represents a time not in either said first or second predetermined time periods.

13. The apparatus of claim 1, wherein said image pick-up means is operable to pick-up a plurality of images to produce a plurality of video signals; and said compression means is operable to compress each of said video signals at respective selected compression ratios to produce a plurality of compressed video signals; and said apparatus further comprises means for multiplexing said plurality of compressed video signals to produce a multiplexed signal.

14. The apparatus of claim 13, wherein said control means is operable to control the respective compression ratio at which each said video signal is compressed in said compression means such that the total data rate of the multiplexed signal is established to not exceed a predetermined data rate.

15. The apparatus of claim 13, further comprising means for demultiplexing the multiplexed signal to recover each of the compressed video signals; and wherein said recording means is comprised of a plurality of recording means each for recording a respective one of the recovered compressed video signals on a respective record medium.

16. A video surveillance system being operable in an intermittent mode and a continuous mode, said video surveillance system, comprising:

a surveillance video camera for producing a video signal representing an observed area;

compression means operable in a plurality of compression modes and having first, second, and third quantization tables for compressing said video signal to produce a compressed video signal, said compression means compressing said video signal at a selectively different compression ratio in each of said compression modes, said compression means utilizing said first, second, and third quantization tables for operations involving a low compression ratio, a middle compression ratio, and a high compression ratio, respectively, such that the first and/or second quantization tables are utilized when operating in said continuous mode to obtain a low and/or middle level of compression and the third quantization table is utilized when operating in said intermittent mode to obtain a high level of compression;

recording means for recording the compressed video signal on a record medium;

detecting means for detecting the occurrence of a predetermined condition and producing a detection signal corresponding thereto; and control means for selecting one of said compression modes in response to the detection signal and controlling the compression means to operate in the selected compression mode.

17. The video surveillance system of claim 16, wherein said compression means is operable to compress the video signal at a relatively low compression ratio in a first compression mode, to compress the video signal at a middle compression ratio in a second compression mode, and to compress the video signal at a relatively high compression ratio in a third compression mode; said detecting means includes first and second sensors for detecting the occurrence of first and second predetermined conditions, respectively; and said control means controls the compression means to operate in the first compression mode when the occurrence of the first predetermined condition is detected, controls the compression means to operate in the second compression mode when the occurrence of only the second predetermined condition is detected, and controls the compression means to operate in the third compression mode when neither the occurrence of either the first or second predetermined conditions is detected.

18. Method of recording a video signal in an intermittent mode and a continuous mode, comprising the steps of:

picking-up an image to produce a video signal corresponding thereto;

compressing the video signal at a selected one of a plurality of different compression ratios to produce a compressed video signal by utilizing first, second, and third quantization tables for operations involving a low compression ratio, a middle compression ratio, and a high compression ratio, respectfully, such that the first and/or second quantization tables are utilized when operating in said continuous mode to obtain a low and/or middle level of compression-and the third quantization table is utilized when operating in said intermittent mode to obtain a high level of compression;

recording the compressed video signal on a record medium; and switching the compression ratio from the relatively high compression ratio to the relatively low compression ratio upon the occurrence of a predetermined condition.

19. The method of claim 18, further comprising the steps of sensing the occurrence of said predetermined condition and producing a detection signal indicating the occurrence of the predetermined condition; and wherein said step of switching is carried out in response to the detection signal.

20. The method of claim 18, further comprising the step of switching from an intermittent recording mode to a continuous recording mode upon the occurrence of the predetermined condition; and wherein said recording step is carried out by continuously recording the compressed video signal in the continuous recording mode and by intermittently recording the compressed video signal in the intermittent recording mode.

21. The method of claim 20, wherein said switching steps includes switching to the intermitting recording mode in the absence of the predetermined condition.

22. The method of claim 18, wherein the relatively low compression ratio corresponds to a first compression mode, the middle compression ratio corresponds to a second compression mode, and the relatively high compression ratio corresponds to a third compression mode; and wherein said switching step includes establishing the compression mode.

23. The method of claim 22, wherein said compressing step is carried out by quantizing the video data using a first quantization table in the first compression mode, using a second quantization table in the second compression mode, and using a third quantization table in the third compression mode.

24. The method of claim 22, further comprising the steps of sensing the occurrence of at least one predetermined condition and producing a detection signal indicating the occurrence of said at least one predetermined condition; and wherein said switching step is carried out by establishing the compression mode in accordance with the detection signal.

25. The method of claim 24, wherein said sensing step is carried out by sensing the occurrence of a first predetermined condition and sensing the occurrence of a second predetermined condition; and said step of producing a detection signal is carried out by producing a detection signal indicating the occurrences of each said first and second predetermined conditions.

26. The method of claim 25, wherein said switching step is carried out by selecting the first compression mode when the detection signal indicates the occurrence of the first predetermined condition, by selecting the second compression mode when the detection signal indicates the occurrence of only the second predetermined condition, and by selecting the third compression mode when the detection signal indicates the occurrence of neither the first or second predetermined conditions.

27. The method of claim 26, further comprising the steps of switching to a continuous recording mode when the detection signal indicates the occurrence of either said first or second predetermined conditions, and switching to an intermittent recording mode when the detection signal indicates the occurrence of neither the first or second predetermined conditions; and wherein said recording step is carried out by continuously recording the compressed video signal in the continuous recording mode and by intermittently recording the compressed video signal in the intermittent recording mode.

28. Method of recording a video signal, comprising the steps of:

picking-up an image to produce a video signal corresponding thereto;

compressing the video signal at a selected one of a plurality of different compression ratios to produce a compressed video signal;

recording the compressed video signal on a record medium;

switching the compression ratio from a relatively high compression ratio to a relatively low compression ratio upon the occurrence of a predetermined condition; and providing a clock signal representing a current time; and wherein said predetermined condition corresponds to a predetermined time period such that said switching step is carried out by switching the compression ratio from the relatively high compression ratio to the relatively low compression ratio when the clock signal represents a time in said predetermined time period.

29. The method of claim 28, wherein said predetermined condition corresponds to first and second predetermined time periods; and said switching step is carried out by switching the compression ratio to the relatively low compression ratio when said clock signal represents a time in said first predetermined time period, by switching the compression ratio to a middle compression ratio when said clock signal represents a time in said second predetermined time period, and by switching the compression ratio to the relatively high compression ratio when said clock signal represents a time not in either said first or second predetermined time periods.

30. The method of claim 18, wherein said step of picking-up an image includes picking-up a plurality of images to produce a plurality of video signals; and said compression step is carried out by compressing each of said video signals at respective selected compression ratios to produce a plurality of compressed video signals; and said method further comprises the step of multiplexing said plurality of compressed video signals to produce a multiplexed signal.

31. The method of claim 30, wherein said switching step includes controlling the respective compression ratio at which each said video signal is compressed such that the total data rate of the multiplexed signal is established to not exceed a predetermined data rate.

32. The method of claim 30, further comprising the step of demultiplexing the multiplexed signal to recover each of the compressed video signals; and wherein said recording step is carried out by recording each of the recovered compressed video signals on a respective record medium.

33. Method of recording a video signal produced in a video surveillance system operable in an intermittent mode and a continuous mode, comprising the steps of:

producing a video signal representing an observed area;

compressing the video signal in a selected one of a plurality of compression modes to produce a compressed video signal, the video signal being compressed at a selectively different compression ratio in each of said compression modes by utilizing first, second, and third quantization tables for operations involving a low compression ratio, a middle compression ratio, and a high compression ratio, respectively, such that the first and/or second quantization tables are utilized when operating in said continuous mode to obtain a low and/or middle level of compression and the third quantization table is utilized when operating in said intermittent mode to obtain a high level of compression;

recording the compressed video signal on a record medium;

detecting the occurrence of a predetermined condition;

producing a detection signal in accordance with the detection of the predetermined condition; and selecting one of said compression modes in response to the detection signal.

34. The method of claim 33, wherein said compressing step is carried out by compressing the video signal at a relatively low compression ratio in a first compression mode, by compressing the video signal at a middle compression ratio in a second compression mode, and by compressing the video signal at a relatively high compression ratio in a third compression mode; said detecting step is carried out by detecting the occurrence of first and second predetermined conditions; and said selecting step is carried out by selecting the first compression mode when the occurrence of the first predetermined condition is detected, selecting the second compression mode when the occurrence of only the second predetermined condition is detected, and selecting the third compression mode when neither the occurrence of either the first or second predetermined conditions is detected.

\* \* \* \* \*